United States Patent
Itagi et al.

(10) Patent No.: US 9,218,836 B2
(45) Date of Patent: Dec. 22, 2015

(54) HEAT ASSISTED MAGNETIC RECORDING HEAD HAVING DUAL WAVEGUIDES

(71) Applicant: SEAGATE TECHNOLOGY LLC, Cupertino, CA (US)

(72) Inventors: Amit Vasant Itagi, Hugo, MN (US); Pierre Asselin, Richfield, MN (US); Frank Edgar Stageberg, Edina, MN (US); Werner Scholz, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/525,289

(22) Filed: Oct. 28, 2014

(65) Prior Publication Data
US 2015/0248906 A1 Sep. 3, 2015

Related U.S. Application Data

(60) Provisional application No. 61/945,881, filed on Feb. 28, 2014.

(51) Int. Cl.
| G11B 11/00 | (2006.01) |
| G11B 5/48 | (2006.01) |
| G11B 5/00 | (2006.01) |

(52) U.S. Cl.
CPC ...... *G11B 5/4866* (2013.01); *G11B 2005/0021* (2013.01)

(58) Field of Classification Search
None
See application file for complete search history.

(56) References Cited

U.S. PATENT DOCUMENTS

| 7,440,660 | B1 * | 10/2008 | Jin et al. | 385/43 |
| 7,538,978 | B2 | 5/2009 | Sato | |
| 8,170,389 | B1 * | 5/2012 | Komura et al. | 385/129 |
| 8,391,106 | B2 | 3/2013 | Shimazawa | |
| 8,451,705 | B2 | 5/2013 | Peng | |
| 8,749,790 | B1 * | 6/2014 | Tanner et al. | 356/445 |
| 2006/0005216 | A1 * | 1/2006 | Rausch | 720/659 |
| 2011/0103201 | A1 * | 5/2011 | Peng et al. | 369/13.33 |
| 2012/0127838 | A1 * | 5/2012 | Komura et al. | 369/13.32 |
| 2012/0163137 | A1 * | 6/2012 | Wang et al. | 369/13.02 |
| 2012/0201491 | A1 | 8/2012 | Zhou | |
| 2012/0327751 | A1 * | 12/2012 | Iwanabe et al. | 369/13.02 |
| 2013/0108212 | A1 | 5/2013 | Peng | |
| 2013/0142020 | A1 * | 6/2013 | Rawat | 369/13.33 |
| 2013/0176839 | A1 | 7/2013 | Peng | |
| 2013/0223196 | A1 * | 8/2013 | Gao et al. | 369/13.24 |
| 2014/0254335 | A1 | 9/2014 | Gage | |

OTHER PUBLICATIONS

U.S. Appl. No. 14/078,280, filed Nov. 12, 2013, Peng.

* cited by examiner

*Primary Examiner* — Tan X Dinh
(74) *Attorney, Agent, or Firm* — Mueting, Raasch & Gebhardt, P.A.

(57) ABSTRACT

Systems that include an energy source configured to provide transverse electric (TE) mode energy; a channel waveguide configured to receive energy from the energy source, the channel waveguide having at least one mirror plane; and a near field transducer (NFT) configured to receive energy from the channel waveguide, the NFT having at least one mirror plane.

13 Claims, 13 Drawing Sheets

HEAT ASSISTED MAGNETIC RECORDING HEAD HAVING DUAL WAVEGUIDES

PRIORITY

This application claims priority to U.S. Provisional Application No. 61/945,881 entitled "DEVICES INCLUDING OPTICAL COMPONENTS" filed on Feb. 28, 2014, the disclosure of which is incorporated herein by reference thereto.

SUMMARY

Disclosed are systems that include an energy source configured to provide transverse electric (TE) mode energy; a channel waveguide configured to receive energy from the energy source, the channel waveguide having at least one mirror plane; and a near field transducer (NFT) configured to receive energy from the channel waveguide, the NFT having at least one mirror plane.

Also disclosed are systems that include an energy source configured to provide transverse electric (TE) mode energy; a waveguide assembly, the waveguide assembly including a first waveguide and a second waveguide, the waveguide assembly configured to receive energy from the energy source, wherein the energy is initially received in the first waveguide of the waveguide assembly; and a near field transducer (NFT) configured to receive energy from the waveguide assembly.

Also disclosed are systems that include an energy source configured to provide transverse electric (TE) mode energy; a waveguide assembly, the waveguide assembly including a first tapered waveguide and a second waveguide, the waveguide assembly configured to receive energy from the energy source, wherein the energy is initially received in the first waveguide of the waveguide assembly; and a near field transducer (NFT) configured to receive energy from the waveguide assembly.

Also disclosed are systems that include an energy source configured to provide transverse electric (TE) mode energy; a channel waveguide configured to receive energy from the energy source, the channel waveguide having at least one mirror plane; and a near field transducer (NFT) configured to receive energy from the channel waveguide, the NFT having at least one mirror plane, wherein the mirror plane of the channel waveguide and the mirror plane of the NFT are offset by an offset distance.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
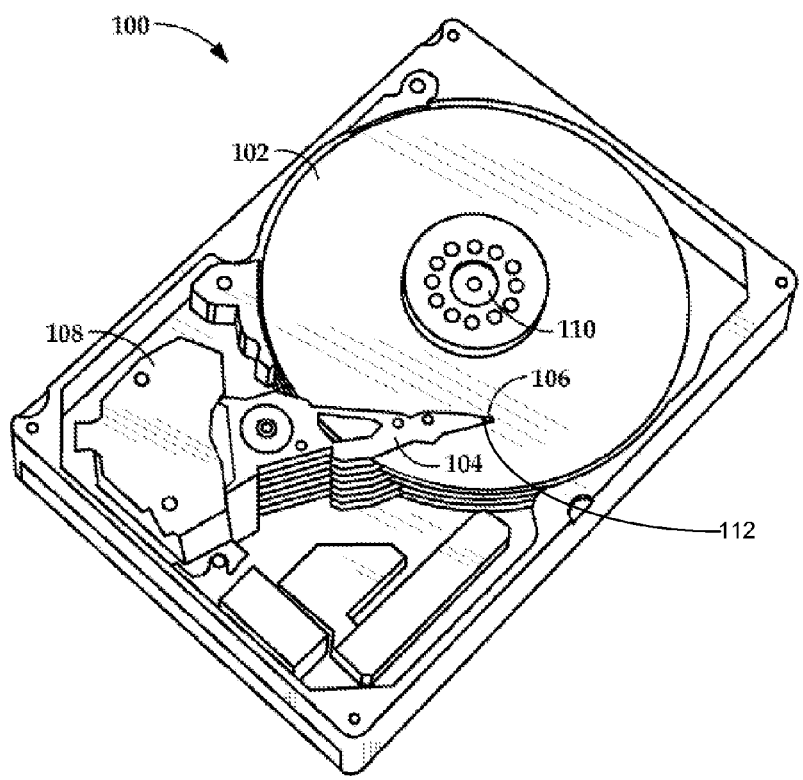
FIG. 1 is a pictorial representation of a data storage device in the form of a disc drive that can include a recording head constructed in accordance with an aspect of this disclosure.

Systems and devices disclosed herein may be used, for example, in read/write heads of a magnetic data storage device such as hard drive apparatus 100 shown in FIG. 1. The apparatus 100 generally includes at least one magnetic disk 102 that rotates around a spindle axis 110. The apparatus 100 can further include an arm 104 with an end-mounted transducer head 106 that is positioned over a surface of the disk while reading from or writing to the disk 102. The arm 104 can be driven by an actuator 108 to move radially across the disk 102. This movement of the arm 104 positions the transducer head 106 over the disk 102 to read from or write to tracks on the disk 102. A hard drive of this type may include multiple arms 105 and disks 106 arranged in stack formation, and may include read/write heads that read/write from or to both surfaces of the disk 102.

The transducer head 106 (which is disposed on or in the slider 112) may include both magnetic read and write heads. A read head generally operates by detecting a changing magnetic field, e.g., changes in direction of magnetic flux caused by relative motion between an encoded magnetic media and the read head. The read head converts the flux reversals into an electrical analog signal that represents data stored on the media. The write head operates in response to a current sent through a conductor surrounding a write pole, which generates a magnetic field at a tip of the write pole. This magnetic field turn changes the orientation of a local magnetic field local at the surface of the disk 102, causing data to be persistently stored on the disk 102. A HAMR recording device focuses heat on the disk 102 for use during the write process.

Disclosed herein are systems and devices. Disclosed systems may be considered as being disposed on or in the slider, on or within the transducer head, or a combination thereof. The systems and devices can be utilized in heat assisted magnetic recording (HAMR), for example.

Disclosed systems and devices are designed and configured to utilize an energy source, such as a laser that produces energy having a transverse electric (TE) mode. Disclosed systems include a configuration of a waveguide or waveguides that focus the plasmons resulting from the TE mode energy in an associated near field transducer (NFT) in phase at the tip of the NFT. Disclosed systems accomplish this without mirrors. Generally, the systems can include an energy source, a channel waveguide or a channel waveguide assembly (including at least a first and a second channel waveguide) and a NFT. Energy from the energy source can be transmitted to the channel waveguide and from there to the NFT.

Electromagnetic waves can be described as including transverse electric (TE) and a transverse magnetic (TM) components. In the TE mode, the main component of the electrical field vector is along the x-direction and lies in a plane (denoted herein as the x-y plane) that is transverse to the direction of travel/propagation (the z-direction). In the TM mode, the magnetic field vector lies in the x-y plane and is transverse to the direction of propagation. Both the TE and TM modes have a fundamental mode ($TE_{00}$ or $TM_{00}$) and a first higher order mode ($TE_{10}$ or $TM_{10}$). Disclosed systems utilized the first higher order TE mode energy from an energy source in order to excite plasmons in a NFT.

Channel waveguides that can be utilized in such a system can support both the fundamental and the first higher order TE modes. Transmission of strictly the fundamental mode through a channel waveguide from a TE mode laser to a NFT tip will result in the plasmons at the tip being out of phase. Transmission of the first higher order mode through a channel waveguide from a TE mode laser to a NFT tip will result in the plasmons at the tip being in phase. Therefore, in disclosed systems, the channel waveguide, or the channel waveguide assembly can be configured to transmit the first higher order mode from a TE mode laser to the NFT.

Energy sources that can be utilized herein can be those that provide transverse electric (TE) mode energy. Depending on the technology used, energy (or light) emitted from an energy source may be polarized in either the TM or the TE mode. In some embodiments, energy sources, such as edge-emitting lasers can provide TE mode energy. The use of lasers that provide TE mode energy can be advantageous in comparison to the use of lasers that provide TM mode energy because they can be easier to obtain.

Energy sources utilized herein may be integrated into or formed in or on a slider for example, and can be referred to as in-slider energy sources or in-slider lasers.

Figure 2:
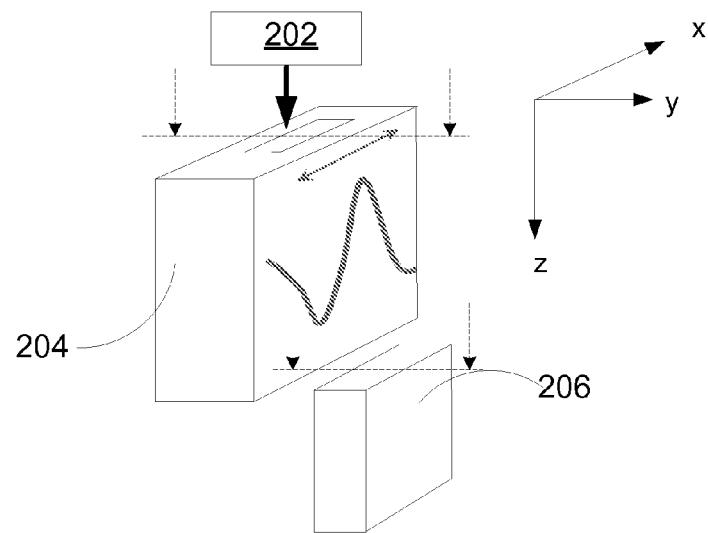
FIG. 2 is a representation of a disclosed system that includes a waveguide and a near field transducer.

A portion of an exemplary system is depicted in FIG. 2. Such a system can include an energy source 202. As discussed above, the energy source 202 is configured to provide or generate transverse electric (TE) mode energy. Exemplary energy sources 202 can include, for example, edge-emitting lasers (EELs). The TE mode energy (or light) generated by the energy source 202 is depicted leaving the energy source, by the arrow in FIG. 2. The energy from the energy source then enters a waveguide 204. Transmission of the energy from the energy source to the waveguide can also be described by the waveguide being configured to receive energy from the energy source, the energy source being configured to transmit energy to the waveguide. In some embodiments, the energy source and the waveguide can be disposed in a way that energy leaving the energy source enters the waveguide.

A channel waveguide has a propagation axis. The propagation axis is the axis along which a guided wave propagates through, in, or along the waveguide. The propagation axis in the exemplary waveguide depicted in FIG. 2 is along the z direction (see the coordinates in FIG. 2). In some embodiments channel waveguides may also have at least one mirror plane. A mirror plane is an imaginary plane which divides an object (in this case a channel waveguide) into two halves, each of which is the mirror image of the other in this plane. The mirror plane of the channel waveguide depicted in FIG. 2 is a plane that would follow the dashed line down through the channel waveguide. This mirror plane can also be described as being the plane that divides the channel waveguide into two halves, each of which is the mirror image of the other in the x-z plane (as shown by the coordinates in FIG. 2).

In the system depicted in FIG. 2, the energy goes into the channel waveguide 204 and is directed out to the NFT 206, or stated another way; the NFT 206 is configured to receive energy from the channel waveguide 204. The NFT can have various structures, such as those generally utilized. Generally, a NFT is made of a plasmonic material that generates near-field light (which can be used to heat the media) from plasmons excited by irradiation with energy from the energy source (e.g., light from a laser). One exemplary type of a NFT is a disc and peg configuration, which can also be referred to as a "lollipop" type NFT. A disc and peg NFT is configured so that the energy enters the disc from the channel waveguide, and produces near-field light at the peg. The NFT can be made of any plasmonic materials, including for example gold (Au) and alloys thereof (such as those found in commonly assigned United States Patent Publication Number 2011/0205863, the disclosure of which is incorporated herein by reference thereto), silver (Ag) and alloys thereof (such as those found in commonly assigned United States Patent Publication Number 2013-0286799, the disclosure of which is incorporated herein by reference thereto), copper (Cu) and alloys thereof, nitrides (such as those found in commonly assigned United States Patent Publication Number 2013-0279315, the disclosure of which is incorporated herein by reference thereto), materials disclosed in commonly assigned application, entitled "DEVICES INCLUDING NEAR FIELD TRANSDUCERS" filed on the same day as the instant application, the disclosure of which is incorporated herein by reference thereto, materials disclosed in commonly assigned U.S. patent application Ser. No. 14/313,651, entitled "MATERIALS FOR NEAR FIELD TRANSDUCERS AND NEAR FIELD TRANSDUCERS CONTAINING SAME", the disclosure of which is incorporated herein by reference thereto, materials disclosed in commonly assigned U.S. patent application Ser. No. 14/313,528, entitled "MATERIALS FOR NEAR FIELD TRANSDUCERS AND NEAR FIELD TRANSDUCERS CONTAINING SAME", the disclosure of which is incorporated herein by reference thereto, materials disclosed in commonly assigned U.S. patent application Ser. No. 14/313,717, entitled "MATERIALS FOR NEAR FIELD TRANSDUCERS, NEAR FIELD TRANSDUCERS CONTAINING SAME, AND METHODS OF FORMING", the disclosure of which is incorporated herein by reference thereto, or combinations thereof.

FIG. 2 illustrates an exemplary NFT 206. The NFT can be described as having a transducing axis. The transducing axis is the axis along which energy excites the plasmonic material and exits the peg (in the case of a disc and peg type configuration). The transducing axis can also be described more generally as the direction from where the energy enters the NFT to where the energy exits the NFT. The transducing axis in the exemplary NFT depicted in FIG. 2 is along the z direction (see the coordinates in FIG. 2). In some embodiments, a NFT has at least one mirror plane. As discussed above, a mirror plane is an imaginary plane which divides an object (in this case a NFT) into two halves, each of which is the mirror image of the other in this plane. The mirror plane of the NFT depicted in FIG. 2 is a plane that would follow the dashed line down through the NFT. This mirror plane can also be described as being the plane that divides the NFT into two halves, each of which is the mirror image of the other in the x-z plane (as shown by the coordinates in FIG. 2). It should be noted that the NFT depicted in FIG. 2 appears to have a second mirror plane in the y-z plane, but in reality, it does not because the material at the disc portion of the NFT is thicker than at the peg portion.

In the system depicted in FIG. 2, the mirror plane of the channel waveguide and the mirror plane of the NFT are aligned. Stated another way, the channel waveguide and the NFT share a mirror plane; or the channel waveguide and the NFT are both symmetric and are aligned.

In the embodiment depicted in FIG. 2, the channel waveguide is configured such that it transmits at least the first higher order TE mode ($TE_{10}$ mode). It should be noted that it could also transmit the fundamental mode ($TE_{00}$ mode). The channel waveguide 204 could, for example, be wider than a channel waveguide designed to transmit only the fundamental mode ($TE_{00}$ mode) and as such would allow both the fundamental mode ($TE_{00}$ mode) and the first higher order mode ($TE_{10}$ mode). In such an embodiment, the first higher order mode ($TE_{10}$ mode) energy could be utilized to excite the plasmons of the NFT, leading to the plasmons being in sync at the tip.

In some embodiments, a laser that generates TE mode energy can be utilized with a channel waveguide assembly. A channel waveguide assembly can be described as including at least two channel waveguides that are positioned adjacent each other in the y direction (see FIG. 3). The channel waveguides can be designed so that light traveling down them (in the z direction) couples across the two waveguides and ultimately causes light of the first higher order TE mode ($TE_{10}$ mode) to exit into the NFT.

Figure 3A:
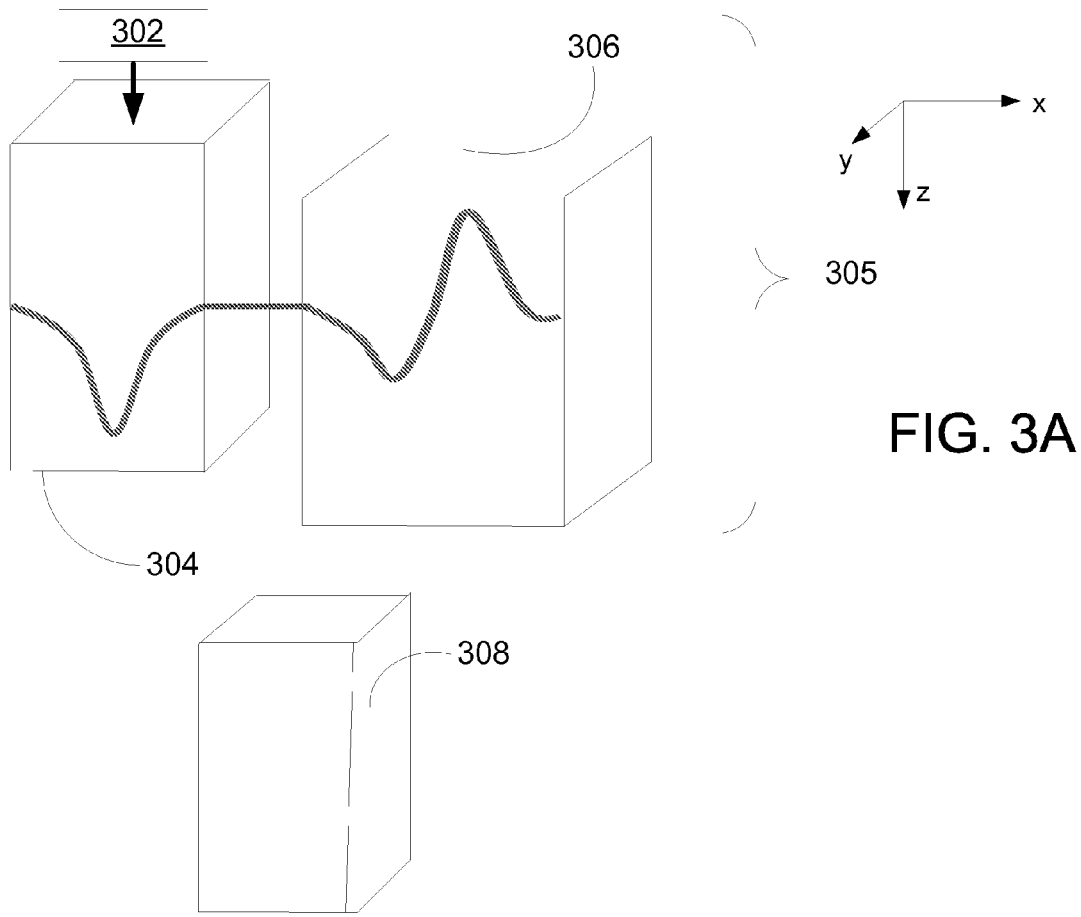
FIGS. 3A and 3B are representations of a disclosed system that includes a waveguide assembly and a near field transducer.

FIG. 3A demonstrates an embodiment of a system disclosed herein. This exemplary system includes an energy source 302, a waveguide assembly 305, and a NFT 308. The waveguide assembly 305 can include a first channel waveguide 304 and a second channel waveguide 306. The first channel waveguide 304 and the second channel waveguide 306 can be positioned to receive the energy from the energy source 302 (for example transverse electric (TE) mode energy). The first waveguide 304 and the second waveguide 306 can be designed and configured so that the mode index of the symmetric mode (or fundamental mode) in the first waveguide 304 matches or is close to that of the anti-symmetric (or first higher order mode) mode for the second waveguide. Because the mode index of the symmetric mode in the first waveguide 304 matches or is close to that of the anti-symmetric mode for the second waveguide, the energy from the first waveguide 304 is transferred to the second waveguide 306. The energy that travels down the channel waveguide assembly 305 then enters the NFT to cause a plasmonic excitation. The mirror plane of the second waveguide 306 (the mirror plane in the x-z plane) can be aligned with the mirror plane of the NFT (the mirror plane in the x-z plane). It should be noted that it is not necessary that the first waveguide 304 and the second waveguide 306 be aligned in the y axis. In some embodiments, the two waveguides 304 and 306 may be in the same XZ plane, as such a configuration can be easier to make. The mirror plane of the first waveguide 304 (the mirror plane in the x-z plane) can be aligned with the mirror plane of the second waveguide 306 (the mirror plane in the x-z plane).

Figure 3B:
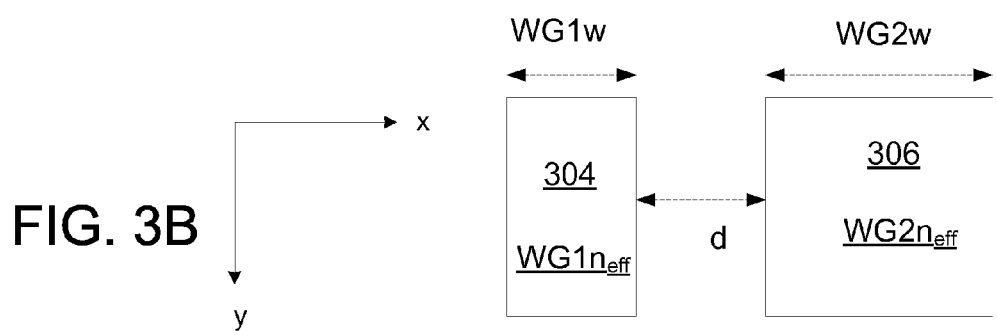

FIG. 3B schematically illustrates the first waveguide 304 and the second waveguide 306. There are a number of characteristics that can be used to describe the waveguides and their relationship. The parameters that can be described can include the width (in the x dimension) of each individual waveguide, the distance between the two waveguides (in the x dimension) and the effective index of refraction of each waveguide. It should be understood by one of skill in the art, having read this specification, that the exemplary dimensions provided herein are only exemplary and can be affected by overall dimensions of the device, material selections, other relevant dimensions discussed herein, other considerations, or some combination thereof.

As seen in FIG. 3B, the width of the first waveguide 304 is given as WG1$w$ and the width of the second waveguide 306 is given as WG2$w$. In some embodiments, the widths of the waveguides are different. The width of one waveguide with respect to the other can vary the ability and/or the efficiency of the coupling between the two waveguides, the quantity of energy transferred out of the channel waveguide assembly, or a combination thereof. In some embodiments, the second waveguide 306 is wider (in the x dimension) than the first waveguide 304; and in some embodiments, the second waveguide 306 is at least two times as wide as the first waveguide. In some embodiments WG1$w$ can be 0.3 micrometers (μm) or greater, or in some embodiments 0.6 μm or greater, or in some embodiments 0.8 μm or greater. In some embodiments WG1$w$ can be 1.5 μm or less, in some embodiments 1.1 μm or less, in some embodiments 0.9 μm or less, or in some embodiments 0.6 μm or less. In some embodiments, the second waveguide 306 (WG2) is wide enough to support two modes, but not three modes and the first waveguide 304 (WG1) is narrow enough to support only one mode. It should also be noted that the widths of the first and second waveguides (WG1 and WG2) are dictated at least in part by the requirement that the mode index of the first waveguide guide's first mode matches the mode index of the second waveguide's second mode.

Also seen in FIG. 3B is the distance or separation (in the x dimension) between the first waveguide 304 and the second waveguide 306, given by d. The distance or separation between the two waveguides affects the ability and/or the efficiency of the coupling between the two waveguides. In some embodiments, d can be 0.3 μm or greater, or in some embodiments 0.35 μm or greater. In some embodiments, d can be 0.6 μm or less or in some embodiments 0.5 μm or less. As the distance d, grows larger, the energy transfer from the first waveguide to the second waveguide is forced to occur over a longer distance (in the z dimension); as such, it is advantageous that the mode indices are closely matched. As the distance d, grows smaller, the energy transfer is occurring over a shorter distance (in the z dimension); as such a less precise match between the mode indices can be tolerated. However, shorter distances can also cause some light to be lost to both waveguides.

The two waveguides can also be described by their effective index of refraction, WG1$neff$ and WG2$neff$. The effective index of refraction is a value that provides an indication of the optical properties of the waveguide. Each mode within a waveguide has its own effective index. Therefore, the second waveguide 306 which has two modes, has two mode indices. In some embodiments, the second mode index of the second waveguide 306 matches the only mode index of 304.

In some embodiments, a system can include a first waveguide having a width (WG1$w$) of 0.35 μm to 0.45 μm or 0.4 μm, and an effective index of refraction (WG1$neff$) of 1.85 to 1.95, or 1.9; a second waveguide having a width (WG2$w$) of 0.85 μm to 0.95 μm, or 0.9 μm and an effective index of refraction (WG1$neff$) of 1.85 to 1.95, or 1.9; and a distance between the two (d) from 0.35 μm to 0.45 μm, or 0.4 μm.

Figure 4A:
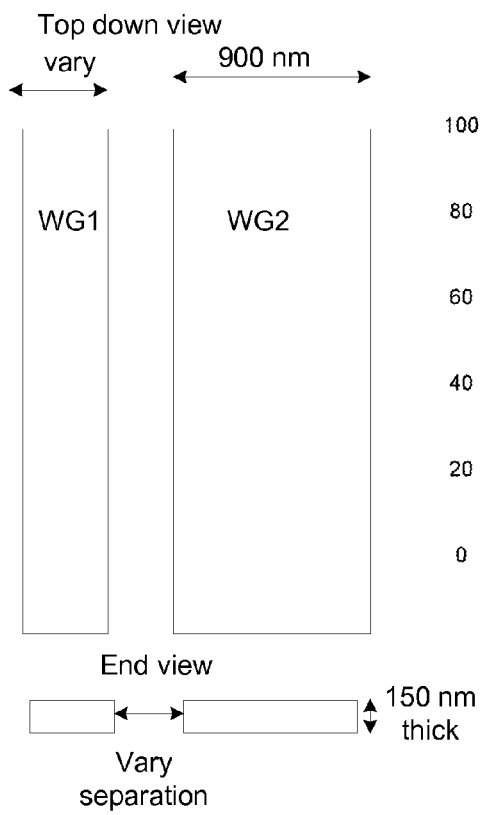
FIGS. 4A to 4I depict a schematic system including two waveguides (FIG. 4A) and modeling showing the result of varying parameters of the system (FIGS. 4B to 4I).
Figure 4A:
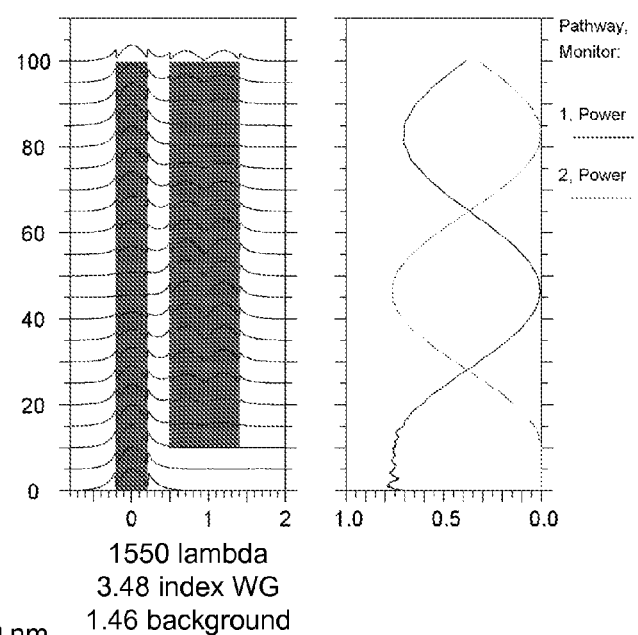
Figure 4B:
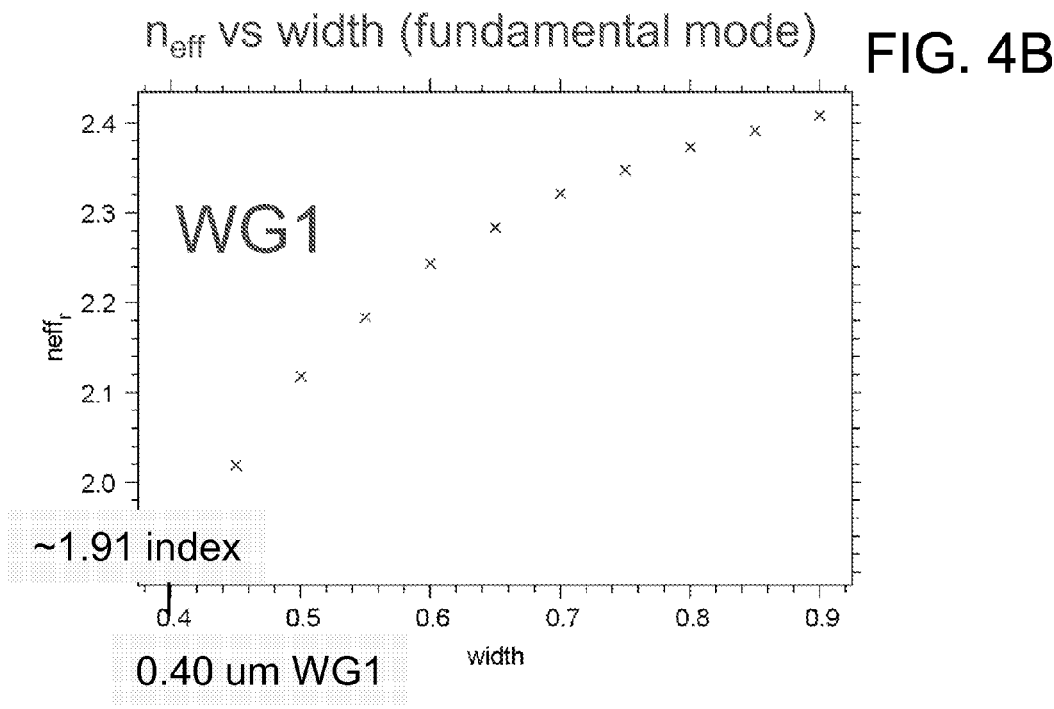
Figure 4C:
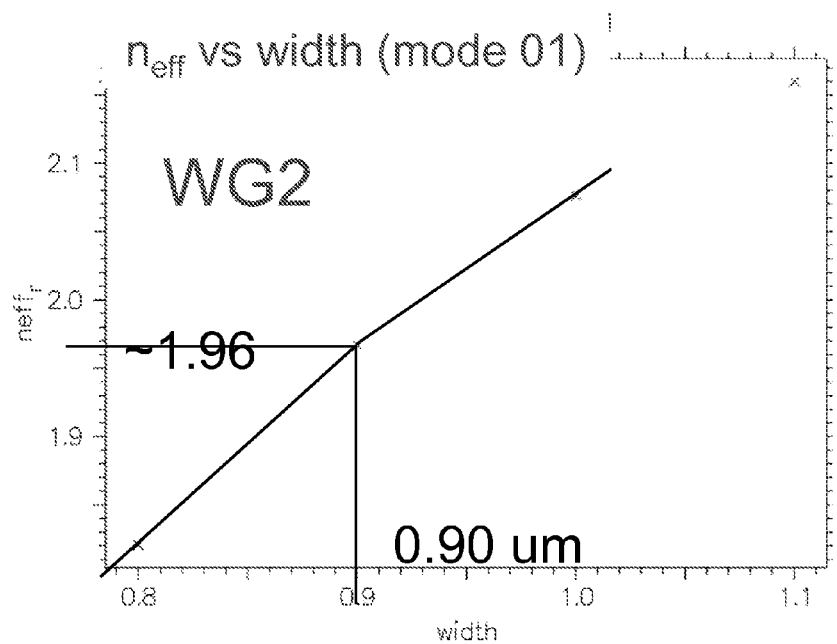

FIG. 4A depicts an exemplary set of two waveguides, WG1 and WG2. WG1 is configured to transmit the TE fundamental mode (symmetric or $TE_{00}$ mode) and WG2 is configured to transmit a TE higher order mode (asymmetric or $TE_{01}$ mode). Modeling was done in order to study the effects of varying some of the descriptive parameters of the system (discussed above). FIGS. 4B and 4C show the effective index of refraction for WG1 transmitting the fundamental mode (FIG. 4B) and WG2 transmitting the first mode (FIG. 4C).

The modeled configuration that FIG. 4A is based on has the mode indices of WG1's first mode and WG2's second mode matched (for example precisely matched) by changing, in this modeled situation WG1w. It should be noted that WG2, or both WG1 and aWG2 could be changed to match the first mode of WG1 and the second mode of WG2. In the situation where the noted modes are matched, 100% of the power is transferred from WG1 to WG2, then transfers back 100% to WG1, and then would repeat forever. In practice, the idea is to end the waveguides as soon as the desired power transfer has occurred.

Figure 4D:
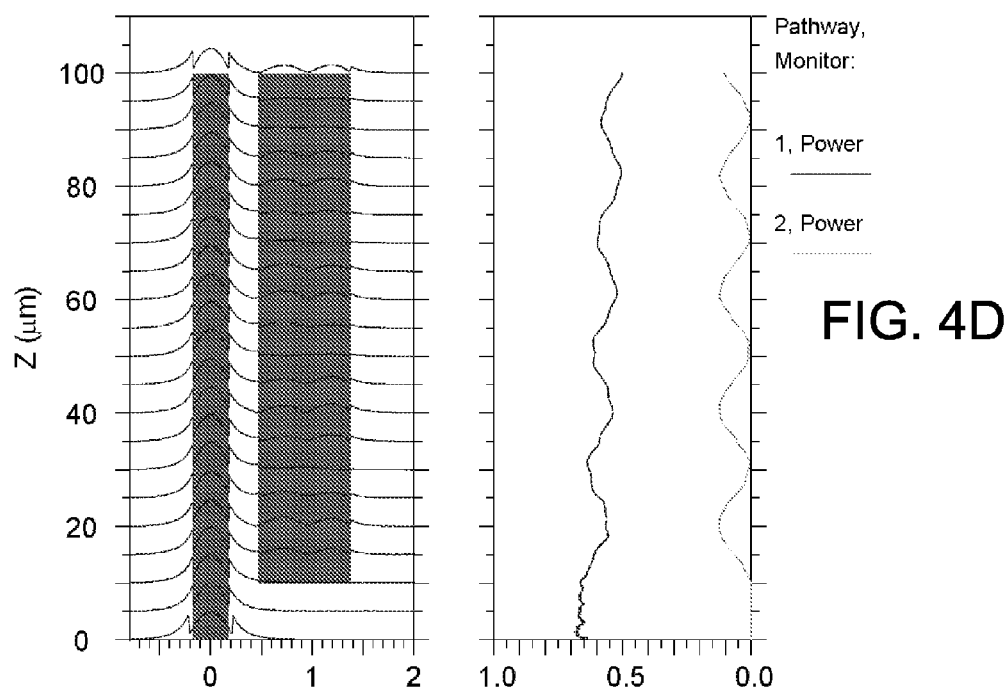

The modeled situation in FIG. 4D depicts the situation when one of the waveguides has the wrong width. It can be seen there that the mode index match is insufficient and only a small amount of power is ever transferred from WG1 to WG2 before returning to WG1.

Figure 4E:
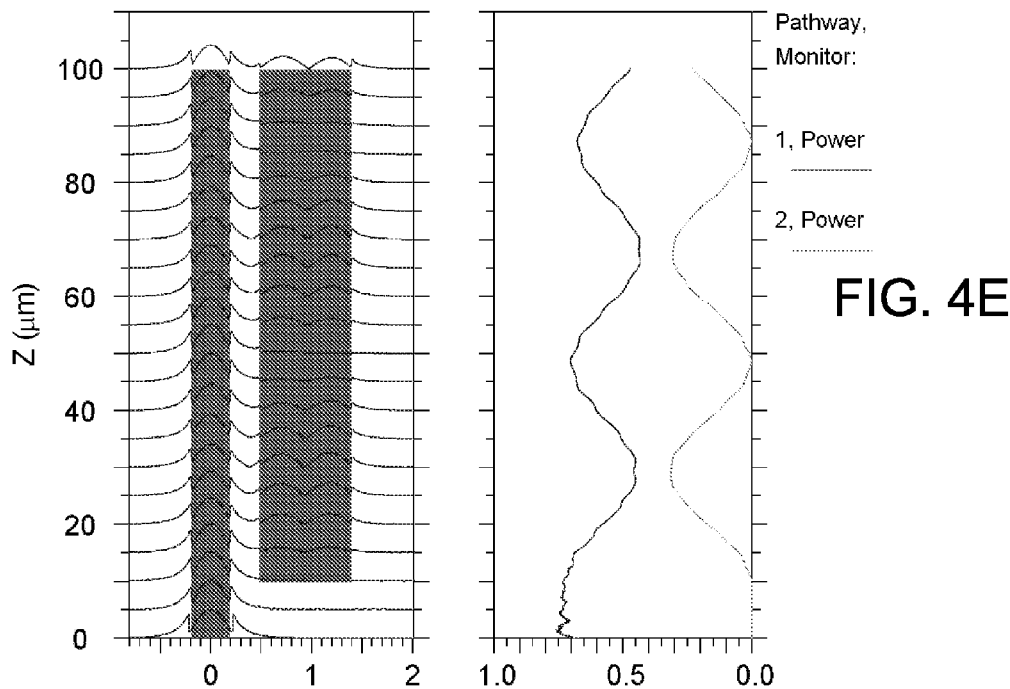
Figure 4F:
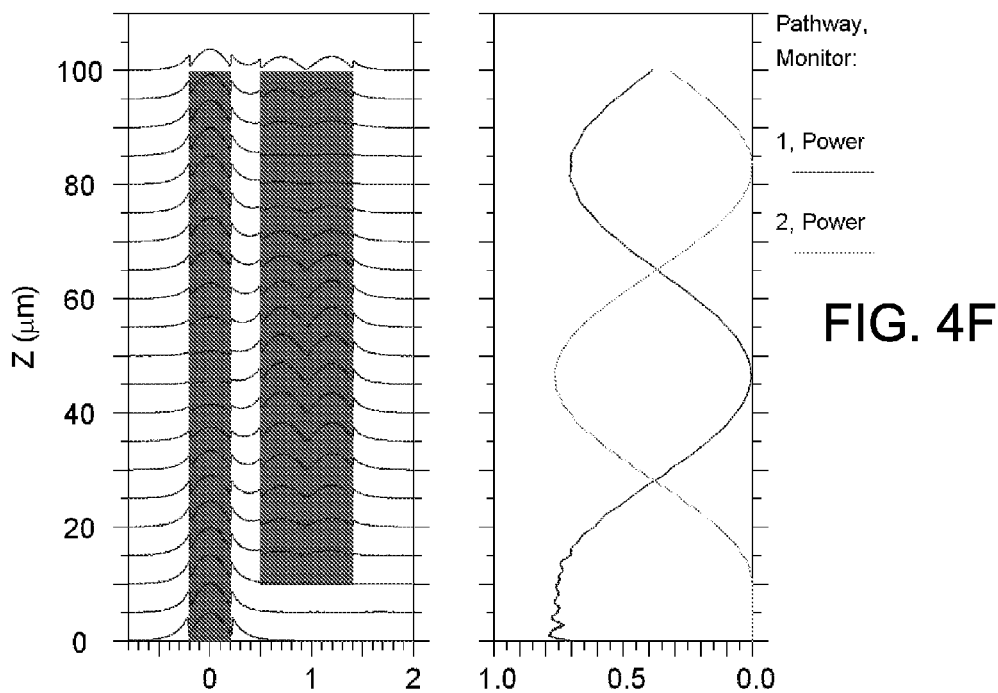
Figure 4G:
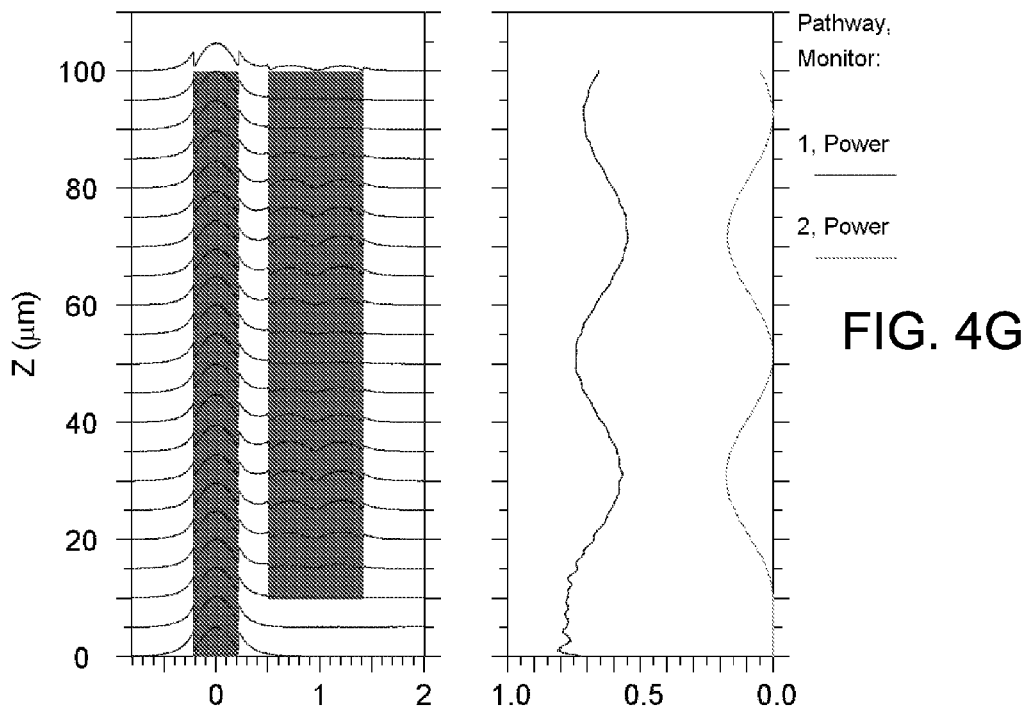
Figure 4H:
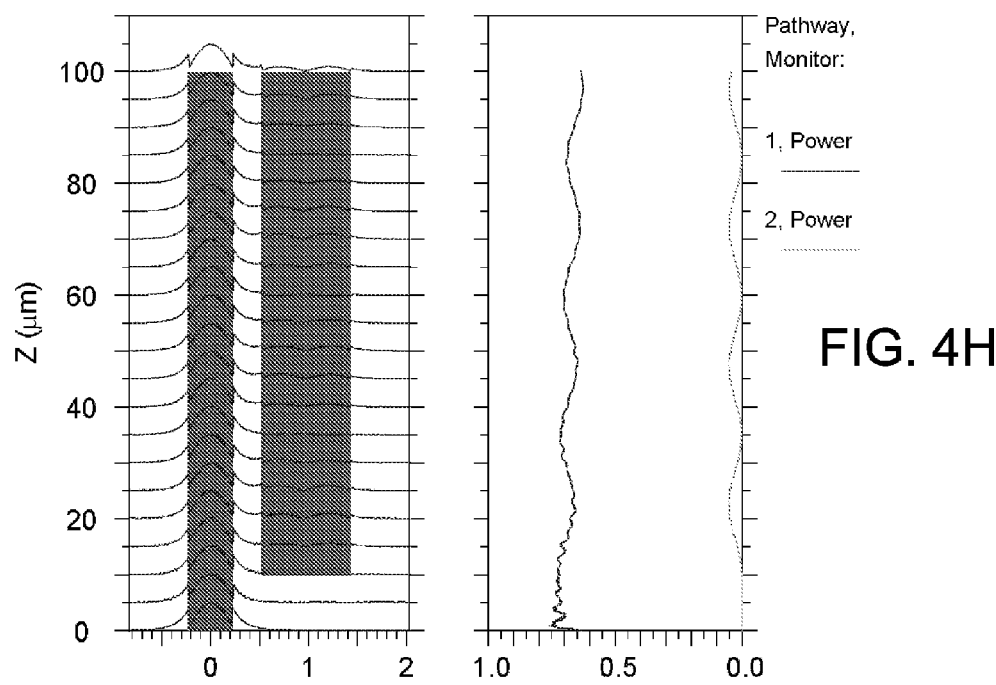
Figure 4I:
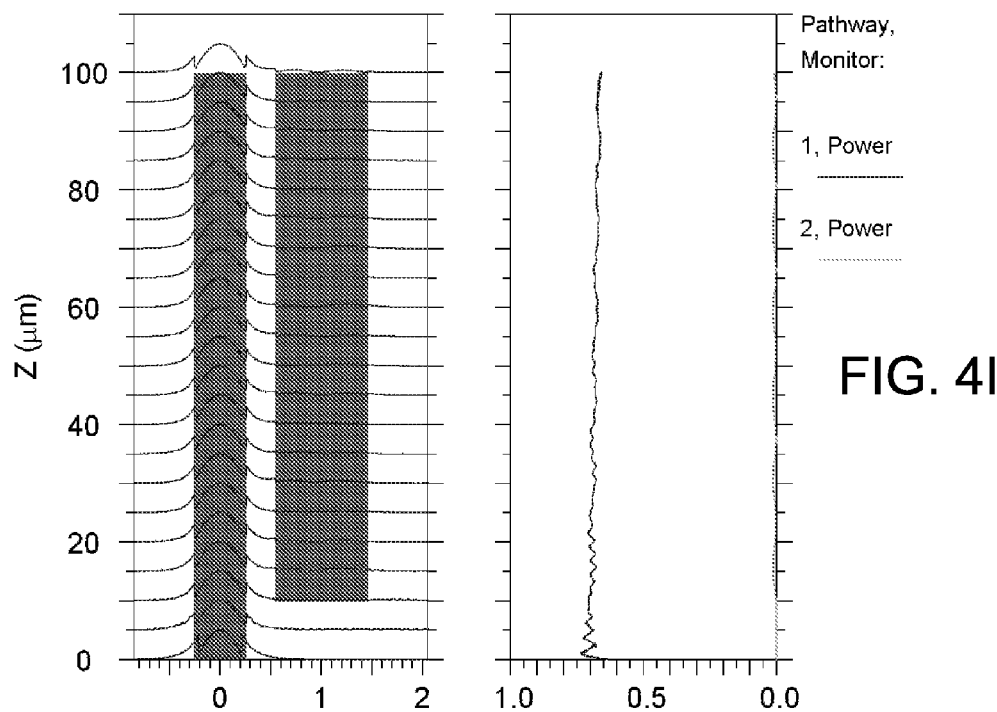

FIGS. 4D through 4I show the coupling between the two waveguides, assuming that WG2 is 900 nm (0.9 μm) and the distance between the two waveguides is 300 nm (0.3 μm). FIG. 4D shows the coupling if WG1 is 0.35 μm wide, FIG. 4E shows the coupling if WG1 is 0.375 μm wide, FIG. 4F shows the coupling if WG1 is 0.4 μm wide, FIG. 4G shows the coupling if WG1 is 0.425 μm wide, FIG. 4H shows the coupling if WG1 is 0.45 μm wide, and FIG. 4I shows the coupling if WG1 is 0.5 μm wide. Comparison of these shows that there is almost 100% coupling between WG1 and WG2 when WG1 is 0.4 μm wide (FIG. 4F), WG2 is 0.9 μm wide, and the two are separated by 0.3 μm.

One or more of the waveguides can also be modified to be tapered. Having at least one of the waveguides in a waveguide assembly tapered can server to relax the manufacturing tolerances of waveguide widths, for example. In some embodiments, having at least one of the waveguides tapered can allow a more effective transfer of a desired portion of the energy from the first waveguide to the second waveguide despite fabrication errors, for example. In some embodiments, a tapered first waveguide can affect a more complete transfer of the fundamental mode ($TE_{00}$ mode) energy from the first waveguide to the first higher order mode ($TE_{10}$ mode) of the second waveguide despite fabrication errors.

Figure 5:
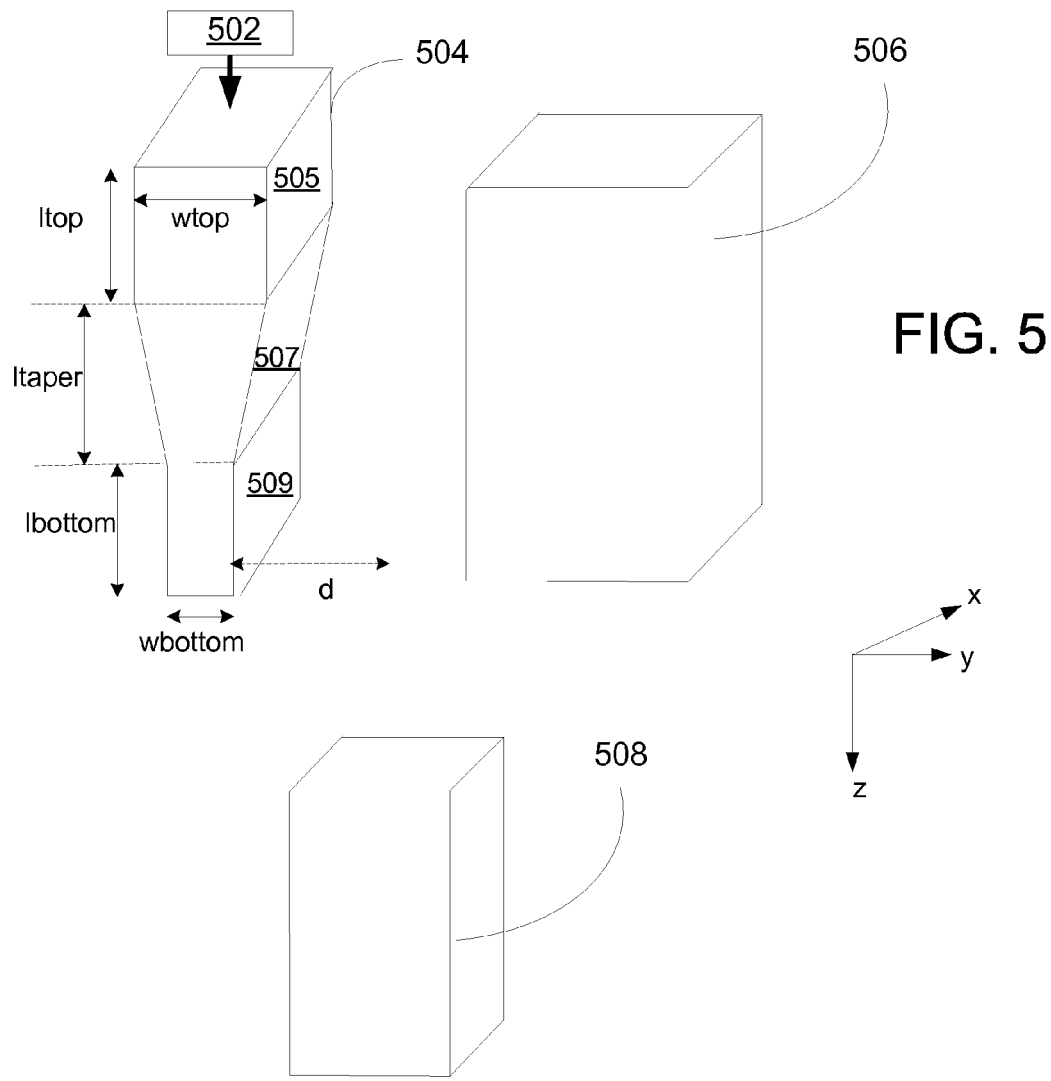
FIG. 5 is a representation of a system that includes a tapered waveguide.

FIG. 5 shows a first waveguide, 504 in a channel waveguide assembly as tapered. Such a tapered waveguide can be described as having a top section 505, a tapered section 507, and a bottom section 509. The taper of the waveguide can be described by the length (in the z dimension) of the top section 505, ltop; the length (in the z dimension) of the bottom section 509, lbottom, the length (in the z dimension) of the tapered region 507, ltaper, the width (in the x dimension) of the top section 505 before the taper, wtop; and the width (in the x dimension) of the bottom section 509 after the taper (wbottom).

In some embodiments, ltop can have a length of 50 μm or greater, or a length of 75 μm or greater for example. In some embodiments, ltop, can have a length of 150 μm or less, or a length of 125 μm or less. In some embodiments, lbottom can have a length 50 μm or greater, or a length of 75 μm or greater for example. In some embodiments, lbottom, can have a length of 150 μm or less, or a length of 125 μm or less. In some embodiments, ltaper can have a length of 25 μm or greater, or a length of 100 μm or greater. In some embodiments, ltaper can have a length of greater than 200 μm, and in some embodiments, ltaper can have a length up to 400 μm. In some embodiments, wtop can be 0.4 μm or greater, and in some embodiments 0.425 μm or greater. In some embodiments, wtop can be 0.5 μm or less, or in some embodiments, 0.475 μm or less. In some embodiments, wbottom can be 0.3 μm or greater, or 0.325 μm or greater. In some embodiments, wbottom can be 0.4 μm or less or in some embodiments 0.375 μm or less.

In embodiments that include a tapered first waveguide, the system can further be described by the distance between the waveguides, d, and the parameters of the second waveguide 506. The second waveguide and NFT 508 are again configured so that energy enters the first and second waveguide 504 and 506 from the energy source 502 travels down the wave guide assembly and interacts and then enters the NFT 508.

Figure 6A:
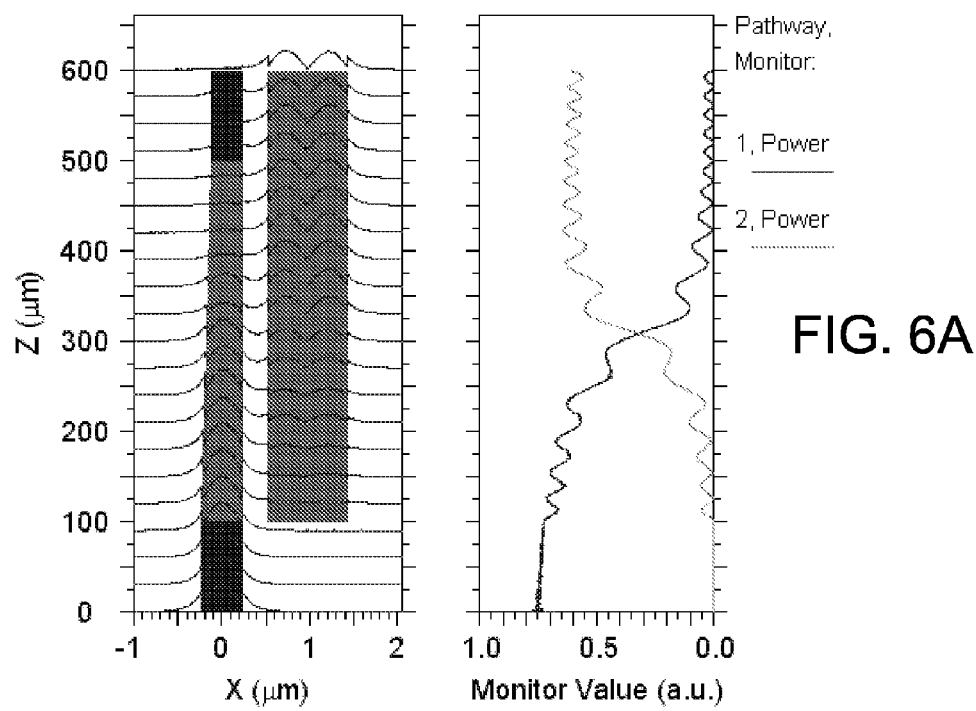
FIG. 6A to 6E show results of modeling a system having a tapered waveguide with varying parameters.
Figure 6B:
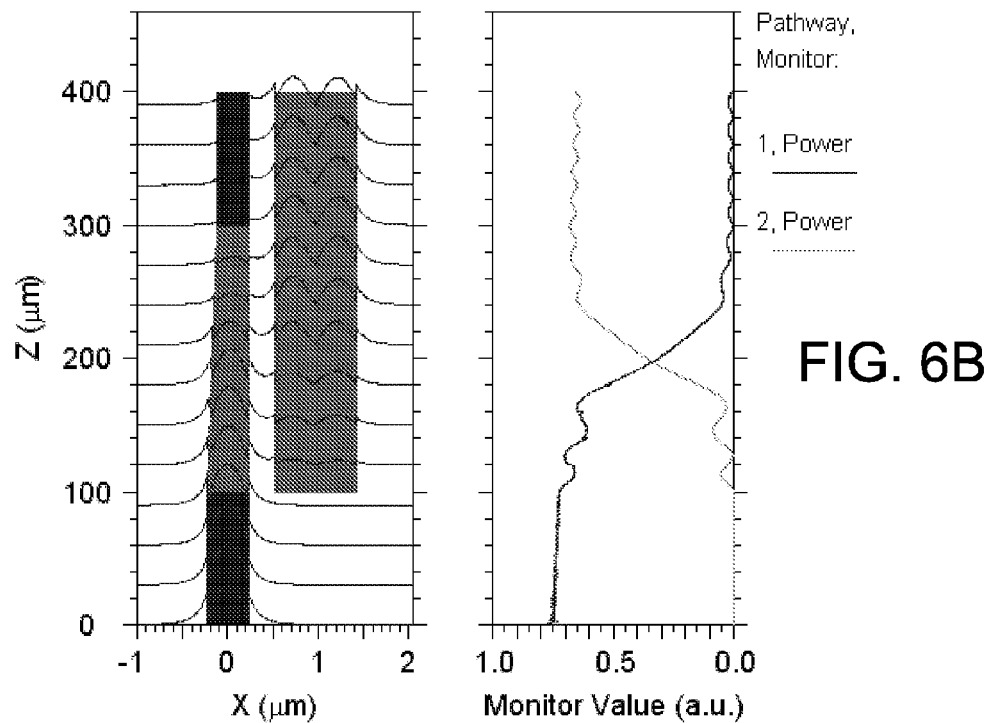
Figure 6C:
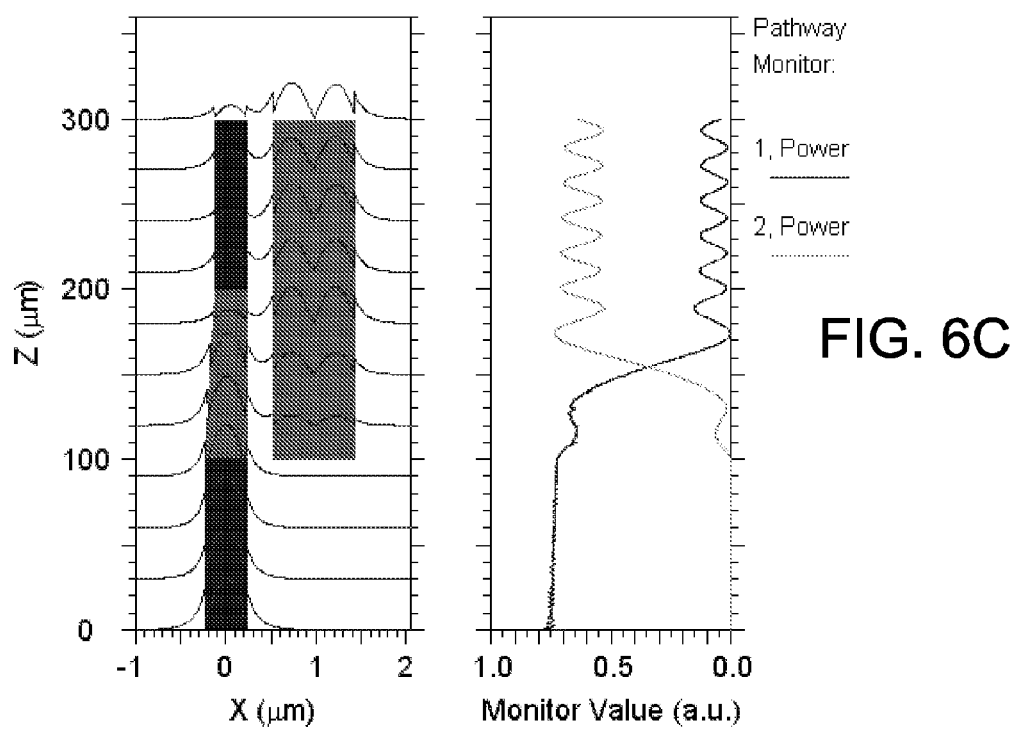
Figure 6D:
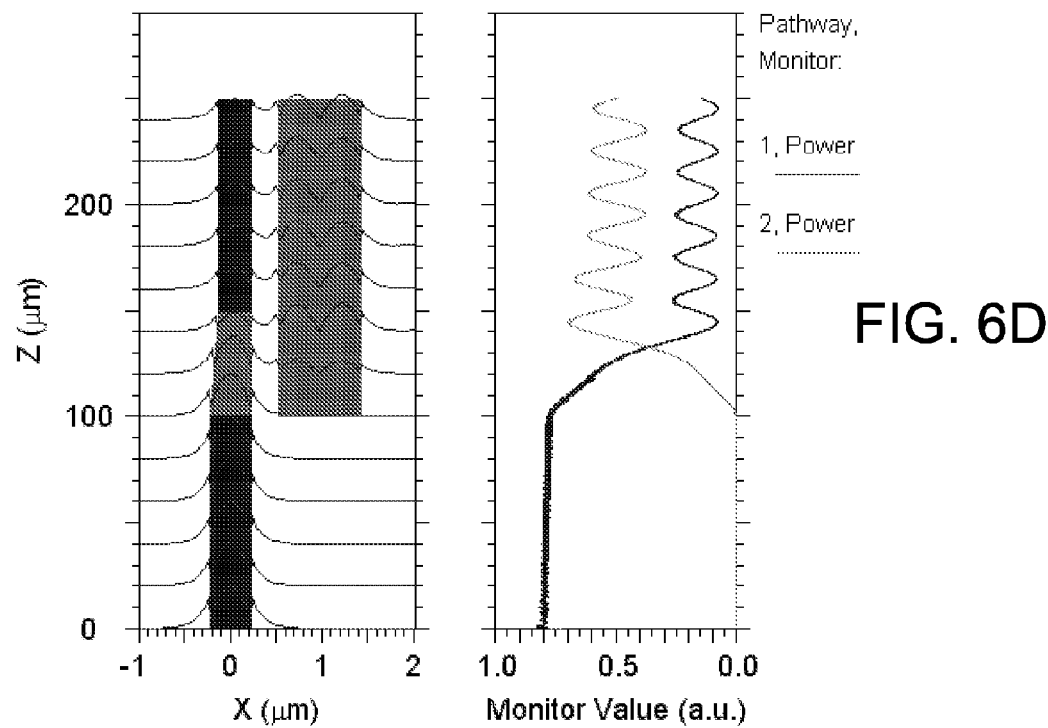
Figure 6E:
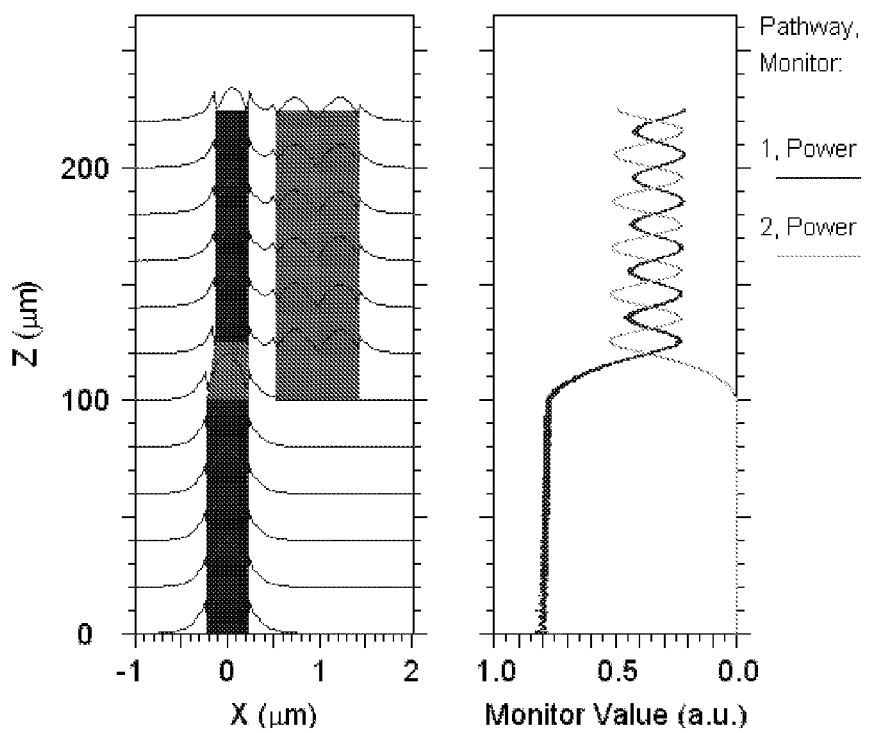

FIGS. 6A through 6E show results of modeling to show the effect of changing the taper length. The modeling shown in FIGS. 6A through 6E assumes that the length of the top section, ltop is 100 μm, the length of the bottom section, lbottom is 100 μm, the width at the top section, wtop is 0.45 μm and the width at the bottom section, wbottom is 0.35 μm. It is also assumed that WG2 is 0.9 μm wide and the separation between the first waveguide WG1 and the second waveguide WG2, or d is 0.3 μm. FIG. 6A shows the coupling if the length of the taper (ltaper) is 400 μm, FIG. 6B shows the coupling if ltaper is 200 μm, FIG. 6C shows the coupling if ltaper is 100 μm, FIG. 6D shows the coupling if ltaper is 50 μm, and FIG. 6E shows the coupling if ltaper is 25 μm. As seen from this modeling, ltaper greater than 200 μm showed almost complete coupling between WG1 and WG2.

Figure 7:
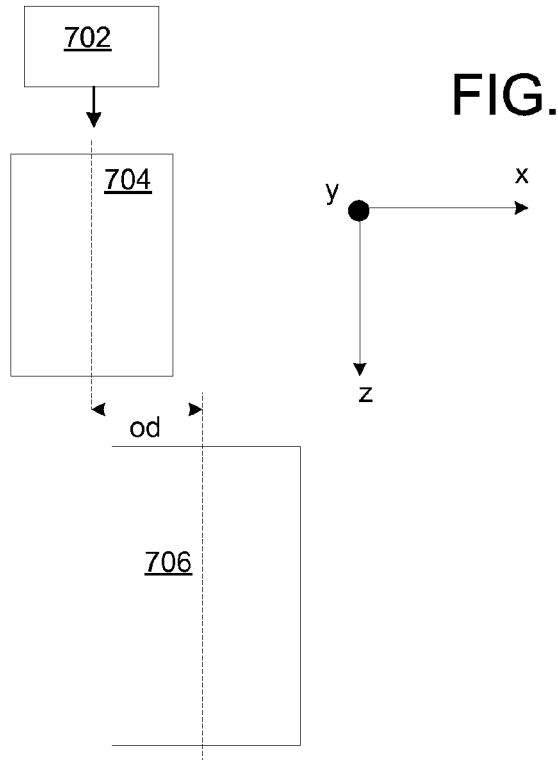
FIG. 7 is a representation of a disclosed system that includes a waveguide and a near field transducer.

Another method of transferring power from a waveguide to a NFT is to utilize a single-mode waveguide(s) and an NFT and have them positioned in an asymmetric manner. FIG. 7 illustrates another embodiment of a disclosed system that includes an energy source 702 configured to provide transverse electric (TE) mode energy, a channel waveguide 704, and a NFT 706. The mirror planes (in the x-z plane) of the channel waveguide and the NFT are shown by the dashed lines. In such embodiments, the NFT 706 is offset from the channel waveguide 704 by an offset distance, od. The offset distance, od can be described as the distance (in the y dimension) between the mirror planes (in the x-z plane) of the channel waveguide and the NFT. The offset distance, od, can be such that the energy leaving the waveguide is coupled into the NFT.

Although the waveguide mode is symmetric and therefore unsuitable to excite a centered NFT, the lateral offset between the waveguide and the NFT results in proper excitation. In some embodiments, od can range from half the width of the waveguide to half the width of the waveguide plus NFT.

Figure 8:
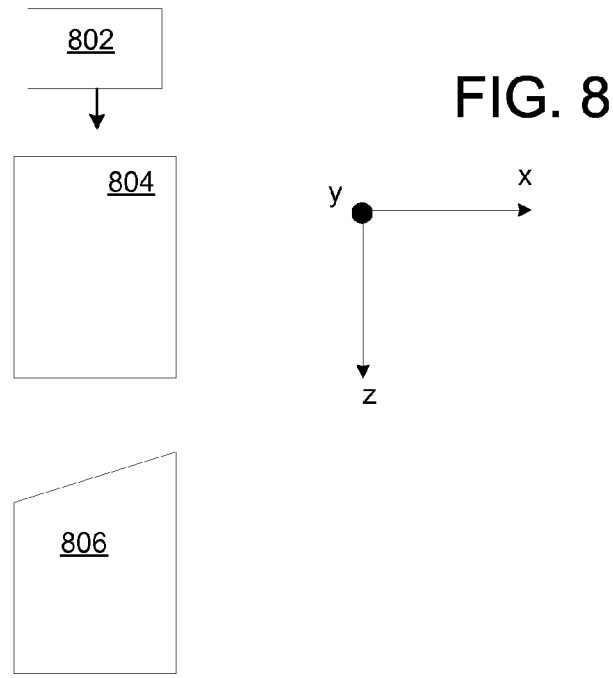
FIG. 8 is a representation of a disclosed system that includes a waveguide and an asymmetric near field transducer.

FIG. 8 illustrates a system that can be described as having a similar functional basis, but utilizes an asymmetric NFT 806. The asymmetric NFT has left to right asymmetry. Here again the waveguide is narrow and carries only a symmetric mode. In some embodiments an energy source 802 can be configured to provide energy to an asymmetric NFT 806 that can be aligned along the mirror plane of a channel waveguide 804. In some other embodiments, an asymmetric NFT could also be offset (like the NFT in FIG. 7) from the channel waveguide.

Also disclosed herein are near field transducers (NFTs) whose configuration can be modified at the top (the region closest to the waveguide), the bottom, or both. It should be noted that such modified NFTs, which can also be referred to as tapered NFTs can be utilized in any embodiments disclosed herein, either prior to or after this discussion. In such embodiments, the modifications can include a taper or a curve. A taper at the top of the NFT can assist in or can increase coupling from the waveguide. A taper at the bottom of the NFT can assist in or can increase confinement of the energy. The region of the NFT that is not tapered (in the case where both the top and bottom are tapered or where only one or the other are tapered), can be referred to as a straight section and can be utilized to tune the impedance.

Figure 9:
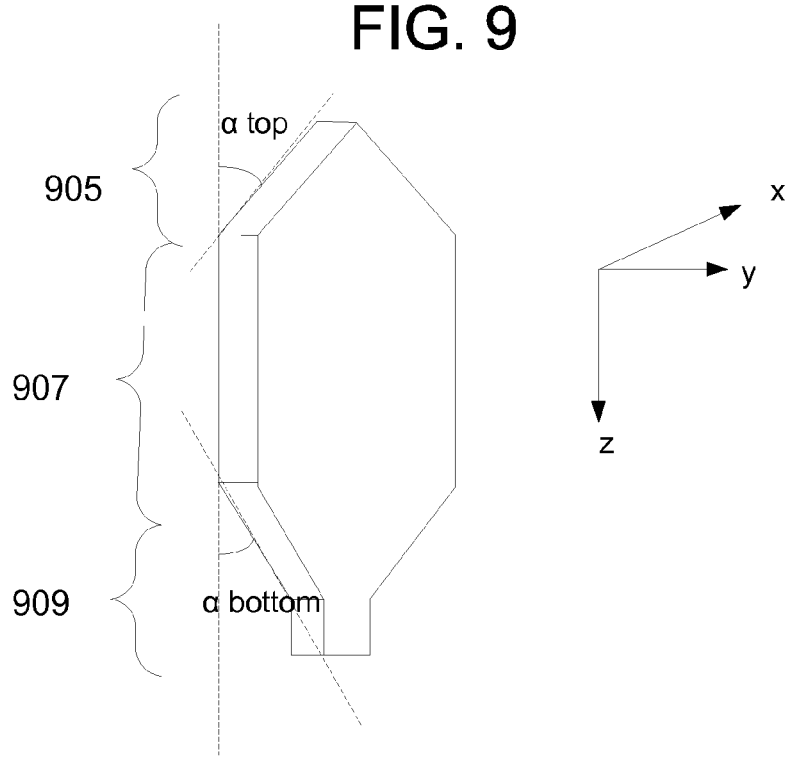
FIG. 9 is a representation of a disclosed system that includes a waveguide and a tapered near field transducer.

FIG. 9 illustrates an embodiment of a NFT that is tapered. In this embodiment, the NFT has a top region 905, a middle region 907 and a bottom region 909. In this particular embodiment, both the top region 905 and the bottom region 909 are tapered. A taper can be described by the angle of the taper. In the exemplary embodiment depicted in FIG. 9, the taper of the top is described by the angle α top. The angle α top can be described as the angle from the straight region (in this case the middle region 907). In some embodiments α top can be as low as 30 degrees, or in some embodiments 40 degrees. In some embodiments α top can be as high as 70 degrees or 60 degrees. The taper of the bottom can be described by the angle α bottom. The angle α bottom can be described as the angle from the straight region (in this case the middle region 907). In some embodiments α bottom can be as low as 20 degrees, or in some embodiments 30 degrees. In some embodiments, α bottom can be as high as 60 degrees, or in some embodiments 50 degrees. The bottom region 909 can also have a portion that is configured to function as a peg to allow further confinement of the energy. In some embodiments, the peg portion can be similar to those utilized in previous NFTs.

α top and α bottom can generally determine the overall area and perimeter length of the NFT. The area, perimeter, and shape can affect the plasmonic response when the NFT is in proximity to the electric field.

Figure 10A:
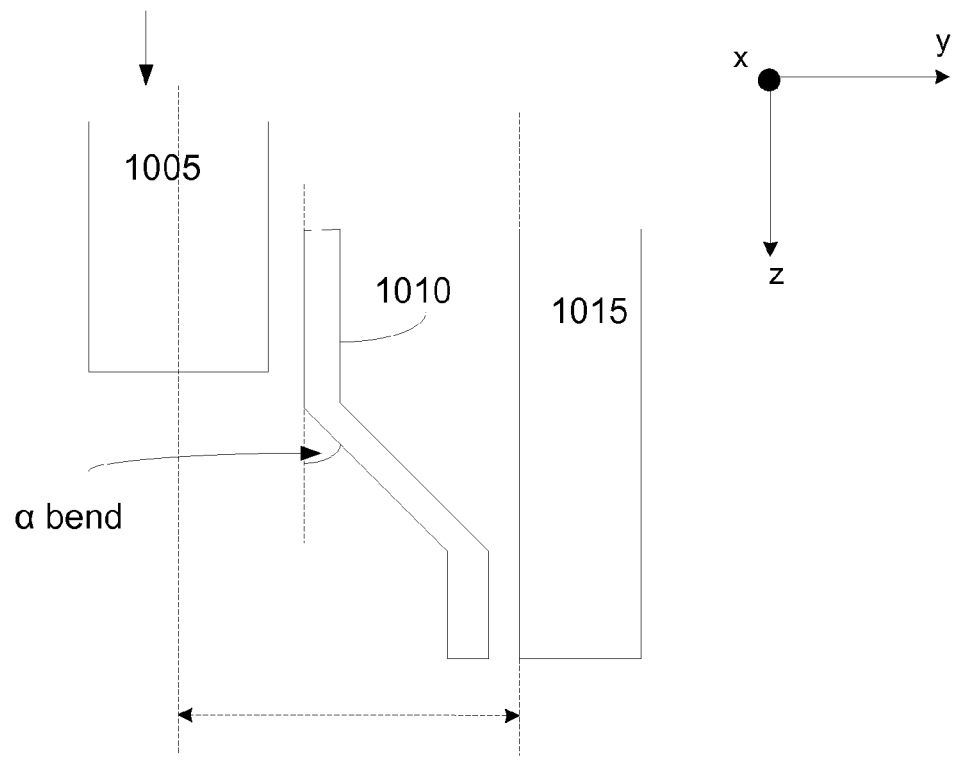
FIGS. 10A to 10C are representations of disclosed systems that include waveguides and near field transducers, and other optional components.

FIG. 10A shows another optional configuration of a NFT. The additional modification discussed with respect to FIG. 10A can be utilized in combination with a tapered NFT or a non-tapered NFT. The NFT 1010 in FIG. 10A is bent. As seen in this figure, the NFT 1010 is bent away from the waveguide 1005 in the y direction. The NFT 1010 is bent towards the write pole 1015. Such a configuration can allow a physical separation of the waveguide 1005 from the write pole 1015. This can be advantageous because it can decrease or eliminate interference from the waveguide in the write pole, can decrease the effect of heat generated in the waveguide on the write pole, or a combination thereof. The extent of the bend in the NFT 1010 can be quantified by considering the distance from the mirror plane (i.e., the center) of the waveguide 1005 to the closest surface of the write pole 1015. Optionally, the bend in the NFT 1010 can be characterized by the angle of the bend as measured from the straight portion of the NFT. This angle is shown as α bend in FIG. 10A. In some embodiments, a bend can be as low as 10 degrees, or in some embodiments as low as 30 degrees. In some embodiments α bend can be as high as 40 degrees.

Figure 10B:
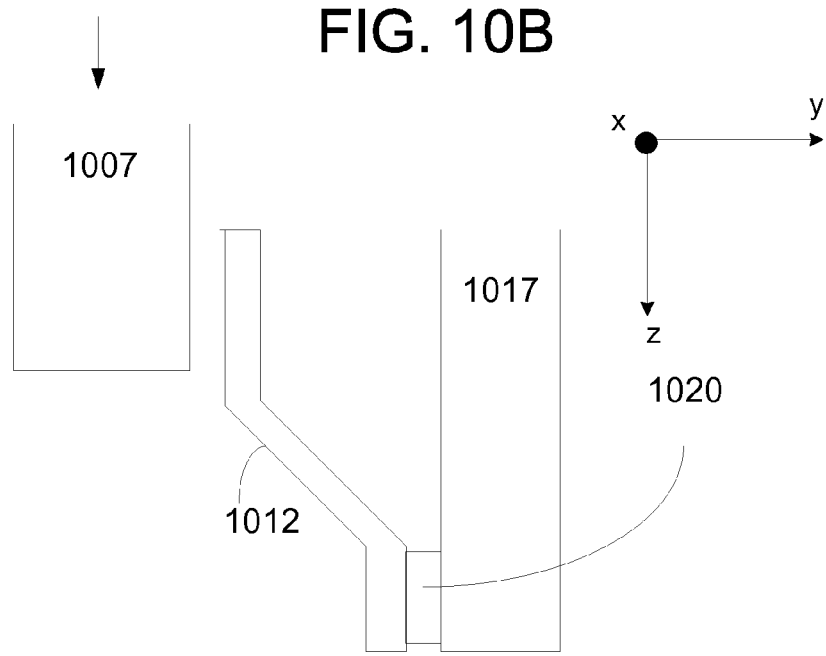

FIG. 10B shows another alternative embodiment that includes a bent NFT and an optional heatsink 1020. In this exemplary embodiment, the NFT 1012 is again bent away from the waveguide 1007 and towards the write pole 1017. The bottom portion of the NFT 1012 that is closest to the write pole 1017 is in physical contact with a heat sink 1020 that is then in physical contact with the write pole 1017. The size, shape, and contact area (both to the NFT 1012 and the write pole 1017) of the heat sink 1020 can be configured in a way that affords a desired level of heat sinking without introducing undesirable levels of detrimental properties. It should be noted that the use of heat sinks similar to those depicted in FIG. 10B can be utilized in devices that do not include a bent NFT.

Figure 10C:
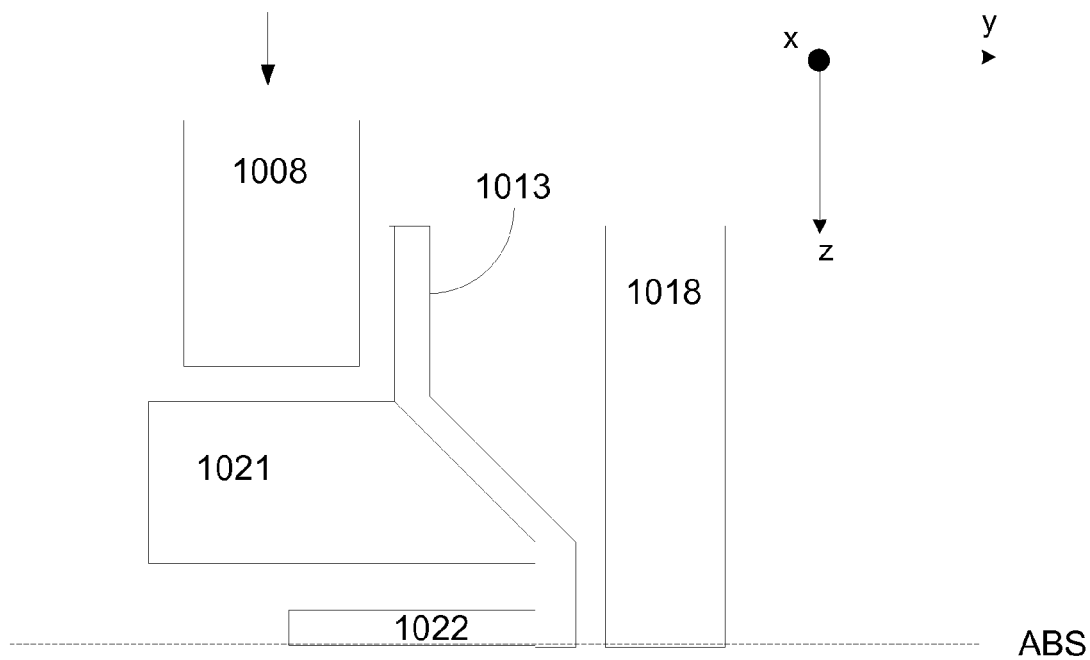

FIG. 10C shows another alternative embodiment that includes a bent NFT and a differently configured optional heat sink 1021. In this exemplary embodiment, the NFT 1013 is again bent away from the waveguide 1008 and towards the write pole 1018. In this embodiment, some portion of the NFT 1013 is in physical contact with a dedicated heat sink 1021. In some embodiments, the heat sink can be a dielectric material. In some embodiments, this dielectric can have high a thermal conductivity. An illustrative material can include Aluminum Nitride for example. In some embodiments, the heat sink can be recessed from the edges of the NFT (not visible in the figure). A sufficiently recessed heat sink would not disturb surface plasmons traveling along the edges of the NFT in the XZ plane. Heat sink 1021 can be made of a non-plasmonic material that has a relatively high thermal conductivity. Exemplary materials that could be utilized in the heat sink 1021 can include, for example tungsten (W), chrome (Cr), ruthenium (Ru), rhodium (Rh), gold (Au), or combinations thereof. FIG. 10C also shows another optional heat sink. This heat sink 1022 is in physical contact with the peg portion of the NFT 1013 and functions as a dedicated heat sink for the peg. In some embodiments, the material of the heat sink 1022 may be a detriment to the coupling efficiency (CE) of the NFT. In such embodiments, at least part of the heat sink 1022 can be a dielectric since it can't be recessed from the edges of the relatively narrow peg.

The optional heat sinks 1021, 1022, or both depicted in FIG. 10C can also serve other functions. For example, the heat sink (or heat sinks) can provide a large flat metallic region at the air bearing surface (ABS). This can assist in reliability and contact detection, for example. The heat sink (or heat sinks) could also function to block any residual energy from the channel waveguide from reaching the ABS (as seen in FIG. 10C) the heat sinks 1021 and 1022 are between the waveguide 1008 and the ABS.

It should be noted that any of the various configurations or components disclosed herein can be used in virtually any combination. Various optional optical elements (mirrors, etc.), not discussed herein can also be included in disclosed systems. Various materials disclosed in commonly assigned United States Patent Application, entitled, "DEVICES INCLUDING NEAR FIELD TRANSDUCERS", U.S. application Ser. No. 14/525,286, filed Oct. 28, 2014, can also be utilized in any disclosed or non-disclosed combination of components.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising"

and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of materials for near field transducers and near field transducers containing the same are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A system comprising:
an energy source configured to provide transverse electric (TE) mode energy;
a channel waveguide configured to receive energy from the energy source, the channel waveguide having at least one mirror plane; and
a near field transducer (NFT) configured to receive energy from the channel waveguide, the NFT having at least one mirror plane.

2. The system according to claim 1, wherein the mirror plane of the channel waveguide and the mirror plane of the NFT are aligned.

3. The system according to claim 1, wherein the channel waveguide and the NFT are both symmetric and are aligned with each other.

4. The system according to claim 1, wherein the channel waveguide transmits at least a first higher order TE mode of the energy from the energy source.

5. The system according to claim 1, wherein the energy source is an edge-emitting laser (EEL).

6. The system according to claim 1 further comprising a second channel waveguide.

7. The system according to claim 6, wherein the first and second channel waveguide are positioned adjacent each other in a first direction and the NFT is positioned adjacent the first and second channel waveguides in a second direction, wherein the first direction is orthogonal to the first.

8. The system according to claim 7, wherein the first and second waveguides independently have modes, and a symmetric mode of the first waveguide is at least close to that of an anti-symmetric mode of the second waveguide.

9. The system according to claim 7, wherein the second waveguide has a mirror plane and the mirror plane of the first waveguide is substantially aligned with the mirror plane of the second waveguide.

10. A system comprising:
an energy source configured to provide transverse electric (TE) mode energy;
a waveguide assembly, the waveguide assembly comprising a first tapered waveguide and a second channel waveguide, the waveguide assembly configured to receive energy from the energy source, wherein the energy is initially received in the first waveguide of the waveguide assembly; and
a near field transducer (NFT) configured to receive energy from the waveguide assembly,
wherein the first tapered waveguide and the second channel waveguide are positioned adjacent each other in a first direction and the NFT is positioned adjacent the first tapered waveguide and the second channel waveguide in a second direction, the first direction being orthogonal to the first.

11. The system according to claim 10, wherein the tapered first waveguide has a top section, a tapered section, and a bottom section.

12. The system according to claim 11, wherein the top section can have a length from about 50 micrometers to about 150 micrometers, the bottom section can have a length from about 50 micrometers to about 150 micrometers, and the tapered section can have a length from about 25 micrometers to about 400 micrometers.

13. The system according to claim 11, wherein the top section can have width from about 0.4 micrometers to about 0.5 micrometers and the bottom section can have a width from about 0.3 micrometers to about 0.4 micrometers.

* * * * *